(12) United States Patent
Morikawa et al.

(10) Patent No.: US 11,559,786 B2
(45) Date of Patent: Jan. 24, 2023

(54) OXYGEN STORAGE MATERIAL AND METHOD FOR PRODUCING THE SAME

(71) Applicant: TOYOTA JIDOSHA KABUSHIKI KAISHA, Toyota (JP)

(72) Inventors: Akira Morikawa, Nagakute (JP); Masahide Miura, Toyota (JP); Nobuyuki Takagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 495 days.

(21) Appl. No.: 16/595,619

(22) Filed: Oct. 8, 2019

(65) Prior Publication Data

US 2020/0114334 A1    Apr. 16, 2020

(30) Foreign Application Priority Data

Oct. 11, 2018  (JP) .............................. JP2018-192803

(51) Int. Cl.
*B01J 23/10*   (2006.01)
*B01J 37/04*   (2006.01)
(Continued)

(52) U.S. Cl.
CPC ............ *B01J 23/10* (2013.01); *B01D 53/945* (2013.01); *B01J 35/023* (2013.01); *B01J 37/009* (2013.01);
(Continued)

(58) Field of Classification Search
None
See application file for complete search history.

(56) References Cited

U.S. PATENT DOCUMENTS 5,958,827 A * 9/1999 Suda ................. B01J 23/63
                                                    502/306
6,605,565 B1 * 8/2003 Zhang .................. C01G 25/00
                                                    502/308
(Continued)

FOREIGN PATENT DOCUMENTS

CN      105339308 A      2/2016
JP      2004-337840 A    12/2004
(Continued)

OTHER PUBLICATIONS

Chinese Office Action dated Jun. 15, 2022, which issued in the corresponding Chinese patent application No. 201910962545.3, including English translation.

*Primary Examiner* — Wayne A Langel
(74) *Attorney, Agent, or Firm* — Dickinson Wright, PLLC (57) ABSTRACT

An oxygen storage material including a ceria-zirconia based composite oxide containing a composite oxide of ceria and zirconia, wherein
 the ceria-zirconia based composite oxide comprises at least one rare-earth element selected from the group consisting of lanthanum, yttrium, and neodymium, and an amount of the rare-earth element(s) contained in total is 1 to 10% by atom in terms of element relative to a total amount of cerium and zirconium in the ceria-zirconia based composite oxide,
 60 to 85% by atom of the entire amount of the rare-earth element(s) is contained in a near-surface upper-layer region extending from a surface of each primary particle of the ceria-zirconia based composite oxide to a depth of 50 nm in the primary particle, and 15 to 40% by atom of the entire amount of the rare-earth element(s) is contained in a near-surface lower-layer region extending from a depth of 50 nm to a depth of 100 nm in the primary particle,
(Continued)

a content ratio of cerium and zirconium in the ceria-zirconia based composite oxide is in a range of 40:60 to 60:40 in terms of an atomic ratio ([Ce]:[Zr]), and the ceria-zirconia based composite oxide has an intensity ratio {I(14/29) value} between a diffraction line at 2θ=14.5° and a diffraction line at 2θ=29° which satisfies the following condition:

$I(14/29)$ value ≥ 0.032, where the intensity ratio {I(14/29) value} is determined from an X-ray diffraction pattern using CuKα obtained by an X-ray diffraction measurement conducted after heating in air under a temperature condition of 1100° C. for 5 hours.

12 Claims, 2 Drawing Sheets

(51) Int. Cl.
| | |
|---|---|
| *B01J 37/03* | (2006.01) |
| *B01J 37/00* | (2006.01) |
| *B01J 37/06* | (2006.01) |
| *B01J 37/02* | (2006.01) |
| *B01J 37/08* | (2006.01) |
| *B01J 37/16* | (2006.01) |
| *B01J 37/12* | (2006.01) |
| *B01D 53/94* | (2006.01) |
| *B01J 35/02* | (2006.01) |
| *F01N 3/10* | (2006.01) |

(52) U.S. Cl.
CPC ....... *B01J 37/0036* (2013.01); *B01J 37/0236* (2013.01); *B01J 37/03* (2013.01); *B01J 37/04* (2013.01); *B01J 37/06* (2013.01); *B01J 37/08* (2013.01); *B01J 37/12* (2013.01); *B01J 37/16* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/20715* (2013.01); *B01D 2255/407* (2013.01); *B01D 2255/908* (2013.01); *F01N 3/101* (2013.01)

(56) References Cited

U.S. PATENT DOCUMENTS

| | | | |
|---|---|---|---|
| 2004/0186016 A1 | 9/2004 | Bog et al. | |
| 2012/0129681 A1* | 5/2012 | Adib | C01G 25/02 977/775 |
| 2013/0029840 A1 | 1/2013 | Morikawa et al. | |
| 2016/0121302 A1* | 5/2016 | Morikawa | B01J 37/12 502/303 |
| 2016/0184801 A1* | 6/2016 | Morikawa | B01J 23/002 502/304 |
| 2016/0250620 A1 | 9/2016 | Morikawa et al. | |
| 2016/0288096 A1* | 10/2016 | Fujiwara | B01J 35/0006 |
| 2017/0239646 A1* | 8/2017 | Matsueda | B01J 35/023 |

FOREIGN PATENT DOCUMENTS

| | | |
|---|---|---|
| JP | 2011-219329 A | 11/2011 |
| JP | 2015-71520 A | 4/2015 |

\* cited by examiner

OXYGEN STORAGE MATERIAL AND METHOD FOR PRODUCING THE SAME

BACKGROUND OF THE INVENTION

Field of the Invention

The present invention relates to an oxygen storage material including a ceria-zirconia based composite oxide containing a composite oxide of ceria and zirconia and a method for producing the oxygen storage material.

Related Background Art

So-called three-way catalysts are known as catalysts for purification of exhaust gas capable of oxidizing carbon monoxide (CO) and hydrocarbons (HC) and simultaneously reducing nitrogen oxides (NOx) in exhaust gas emitted from internal combustion engines such as automotive engines.

For purifying exhaust gas by using a catalyst for purification of exhaust gas, it is known that a material having oxygen storage capacity (OSC) capable of storing oxygen when the oxygen concentration in the exhaust gas is high and releasing oxygen when the oxygen concentration in the exhaust gas is low is used as a support or auxiliary catalyst for a catalyst for purification of exhaust gas to enhance the ability to purify exhaust gas by reducing the fluctuation in oxygen concentration in the exhaust gas.

Conventionally, ceria has been used preferably as such an oxygen storage material having OSC, and various oxygen storage materials including a ceria-zirconia based composite oxide containing a composite oxide of ceria and zirconia have been developed recently.

For example, Japanese Unexamined Patent Application Publication No. 2011-219329 (Patent Literature 1) discloses a ceria-zirconia based composite oxide containing a composite oxide of ceria and zirconia, wherein a content ratio of cerium and zirconium in the composite oxide is in a range of 43:57 to 48:52 in terms of mole ratio ([cerium]:[zirconium]), and an intensity ratio {I(14/29) value} between a diffraction line at $2\theta=14.5°$ and a diffraction line at $2\theta=29°$ and an intensity ratio {I(28/29) value} between a diffraction line at $2\theta=28.5°$ and a diffraction line at $2\theta=29°$ respectively satisfy the following conditions: I(14/29) value≥0.015 and I(28/29) value≤0.08, where the intensity ratio {I(14/29) value} and the intensity ratio {I(28/29) value} are determined from an X-ray diffraction pattern using CuKα obtained by an X-ray diffraction measurement conducted after heating in air under a temperature condition of 1100° C. for 5 hours, as well as a method for producing the ceria-zirconia based composite oxide. According to the invention described in Patent Literature 1, it is possible to provide a ceria-zirconia based composite oxide which has a high heat resistance and can exhibit an excellent oxygen storage capacity even after exposure to high temperature for a long period.

Meanwhile, Japanese Unexamined Patent Application Publication No. 2015-71520 (Patent Literature 2) discloses a ceria-zirconia based composite oxide containing a composite oxide of ceria and zirconia, wherein the ceria-zirconia based composite oxide contains at least one rare-earth element selected from the group consisting of lanthanum, yttrium, and praseodymium whose amount is, in total, 0.1 to 4.0% by atom in terms of element relative to a total amount of cerium and zirconium in the ceria-zirconia based composite oxide, 90% by atom or more of the entire amount of the rare-earth element (s) is contained in a near-surface region located within 50 nm from a surface of each primary particle of the ceria-zirconia based composite oxide, a content ratio of cerium and zirconium in the ceria-zirconia based composite oxide is in a range of 43:57 to 48:52 in terms of mole ratio ([cerium]:[zirconium]), the primary particles of the ceria-zirconia based composite oxide have an average particle diameter of 2.2 to 4.5 μm, and an intensity ratio {I(14/29) value} between a diffraction line at $2\theta=14.5°$ and a diffraction line at $2\theta=29°$ and an intensity ratio {I(28/29) value} between a diffraction line at $2\theta=28.5°$ and a diffraction line at $2\theta=29°$ respectively satisfy the following conditions: I(14/29) value≥0.02 and I (28/29) value≤0.08, where the intensity ratio {I(14/29) value} and the intensity ratio {I(28/29) value} are determined from an X-ray diffraction pattern using CuKα obtained by an X-ray diffraction measurement conducted after heating in air under a temperature condition of 1100° C. for 5 hours, as well as a method for producing the ceria-zirconia based composite oxide. According to the invention described in Patent Literature 2, it is possible to provide a ceria-zirconia based composite oxide which has both a better oxygen storage capacity and a better heat resistance, and which can exhibit an excellent oxygen storage capacity even after exposure to high temperature for a long period.

However, a catalyst for purification of exhaust gas has recently been required to have increasingly better properties, especially, increasingly better properties in terms of oxygen storage capacity at low temperature (low-temperature OSC) and high-temperature durability, and there has been a demand for an oxygen storage material having both an excellent low-temperature OSC and an excellent high-temperature durability such that the excellent oxygen storage capacity is expressed from a lower temperature and also the low-temperature activity of the oxygen storage capacity is sufficiently maintained even after exposure to high-temperature exhaust gas for a long period. In this respect, conventional oxygen storage materials including ceria-zirconia based composite oxides as described in Patent Literature 1 and 2 are not necessarily sufficient.

SUMMARY OF THE INVENTION

The present invention has been made in view of the above-described problems of the conventional technologies, and an object of the present invention is to provide an oxygen storage material having both an excellent low-temperature oxygen storage capacity (low-temperature OSC) and an excellent high-temperature durability such that the excellent oxygen storage capacity (OSC) is expressed from a low temperature of about 300° C., and the low-temperature activity of the oxygen storage capacity is sufficiently maintained even after exposure to exhaust gas at a high temperature of about 1100° C. for a long period, as well as a method for producing the oxygen storage material.

The present inventors have conducted intensive study to achieve the above-described object, and consequently have first found that the invention described in Patent Literature 2 in which the ceria-zirconia based composite oxide is obtained by calcining a ceria-zirconia based composite oxide powder supporting a rare-earth element such as lanthanum on its surface under an oxidizing atmosphere at 600 to 1200° C. is not necessarily sufficient in terms of further improvement in low-temperature oxygen storage capacity (low-temperature OSC) and high-temperature durability, although 90% by atom or more of the entire amount of the rare-earth element is contained in the near-surface region extending from the surface of each primary particle of the obtained ceria-zirconia based composite oxide to a depth of 50 nm in the primary particle.

Then, the present inventors have further conducted intensive study, and consequently found that when a ceria-zirconia based composite oxide powder supporting a rare-earth element selected from lanthanum, yttrium, and neodymium on its surface is subjecting to a reduction treatment under a reducing atmosphere at a high temperature of 1200 to 1600° C., the rare-earth element(s) penetrate into a deeper region from the surface of each primary particle of the ceria-zirconia based composite oxide than in conventional cases, and a ceria-zirconia based composite oxide can be obtained which contains the rare-earth elements not only in the near-surface upper-layer region extending from the surface of each primary particle to a depth of 50 nm in the primary particle, but also in the near-surface lower-layer region extending from a depth of 50 nm to a depth of 100 nm in the primary particle in their respective predetermined amounts, so that an excellent low-temperature oxygen storage capacity (low-temperature OSC) and an excellent high-temperature durability are exhibited astonishingly. This finding has led to the completion of the present invention.

Specifically, the oxygen storage material of the present invention is an oxygen storage material comprising a ceria-zirconia based composite oxide containing a composite oxide of ceria and zirconia, wherein the ceria-zirconia based composite oxide comprises at least one rare-earth element selected from the group consisting of lanthanum, yttrium, and neodymium, and an amount of the rare-earth element(s) contained in total is 1 to 10% by atom in terms of element relative to a total amount of cerium and zirconium in the ceria-zirconia based composite oxide, 60 to 85% by atom of the entire amount of the rare-earth element(s) is contained in a near-surface upper-layer region extending from a surface of each primary particle of the ceria-zirconia based composite oxide to a depth of 50 nm in the primary particle, and 15 to 40% by atom of the entire amount of the rare-earth element(s) is contained in a near-surface lower-layer region extending from a depth of 50 nm to a depth of 100 nm in the primary particle, a content ratio of cerium and zirconium in the ceria-zirconia based composite oxide is in a range of 40:60 to 60:40 in terms of an atomic ratio ([Ce]:[Zr]), and the ceria-zirconia based composite oxide has an intensity ratio {I(14/29) value} between a diffraction line at 2θ=14.5° and a diffraction line at 2θ=29° which satisfies the following condition:

$I(14/29)$ value≥0.032, where the intensity ratio {I(14/29) value} is determined from an X-ray diffraction pattern using CuKα obtained by an X-ray diffraction measurement conducted after heating in air under a temperature condition of 1100° C. for 5 hours.

In the oxygen storage material of the present invention, 80% by atom or more of the entire amount of the rare-earth element(s) is preferably contained in a near-surface region extending from the surface of each primary particle of the ceria-zirconia based composite oxide to a depth of 100 nm in the primary particle.

Furthermore, in the oxygen storage material of the present invention, the primary particles of the ceria-zirconia based composite oxide preferably have an average particle diameter of 2.2 to 4.5 μm.

Moreover, the ceria-zirconia based composite oxide preferably further comprises at least one additive element selected from the group consisting of praseodymium, scandium, samarium, gadolinium, terbium, dysprosium, ytterbium, lutetium, magnesium, calcium, strontium, barium, and radium. In this case, an amount of the additive element(s) contained in total is preferably 1 to 20% by atom in terms of element relative to the total amount of cerium (Ce) and zirconium (Zr) in the ceria-zirconia based composite oxide.

Meanwhile, a method for producing an oxygen storage material of the present invention is a method for producing an oxygen storage material comprising a ceria-zirconia based composite oxide containing a composite oxide of ceria and zirconia, the method comprising the steps of:

preparing a ceria-zirconia based composite oxide powder having a content ratio of cerium and zirconium in a range of 40:60 to 60:40 in terms of atomic ratio ([Ce]:[Zr]);

causing the composite oxide powder obtained in the preparing step to support at least one rare-earth element selected from the group consisting of lanthanum, yttrium, and neodymium such that an amount of the rare-earth element(s) contained in total is 1 to 10% by atom in terms of element relative to a total amount of cerium and zirconium in the ceria-zirconia based composite oxide; and subjecting the ceria-zirconia based composite oxide powder supporting the rare-earth element(s) to a reduction treatment under a reducing atmosphere at 1200 to 1600° C. to obtain the oxygen storage material comprising the ceria-zirconia based composite oxide of the present invention.

The method for producing an oxygen storage material of the present invention preferably further comprises, before the reduction treatment, a step of subjecting the ceria-zirconia based composite oxide powder supporting the rare-earth element(s) to an oxidation treatment under an oxidizing atmosphere at 300 to 800° C.

Moreover, the method for producing an oxygen storage material of the present invention preferably further comprises, after the reduction treatment, a step of subjecting the ceria-zirconia based composite oxide powder, which has been subjected to the reduction treatment, to an oxidation treatment under an oxidizing atmosphere at 300 to 800° C.

Note that although it is not exactly clear why the oxygen storage material and the method for producing the same of the present invention achieve the above-described object, the present inventors speculate as follows. Specifically, first, in the invention described in Patent Literature 2, where the ceria-zirconia based composite oxide is obtained by calcining a ceria-zirconia based composite oxide powder supporting a rare-earth element such as lanthanum on its surface under an oxidizing atmosphere at 600 to 1200° C., the rare-earth element is solid-dissolved in the vicinity of the surfaces of primary particles of the ceria-zirconia based composite oxide by randomly substituting both Ce sites and Zr sites indiscriminately. Although the rare-earth element penetrates into each primary particle through the surface thereof, the present inventors speculate that the depth of the penetration is limited, and 90% by atom or more of the entire amount of the rare-earth element(s) is contained in the near-surface region extending from the surface of each primary particle to a depth of 50 nm in the primary particle. In contrast, in the present invention, where the ceria-zirconia based composite oxide is obtained by subjecting a ceria-zirconia based composite oxide powder supporting a rare-earth element selected from lanthanum, yttrium, and neodymium on its surface to a reduction treatment under a reducing atmosphere at a high temperature of 1200 to 1600° C., the rare-earth element is solid-dissolved in the vicinity of the surfaces of the primary particles of the ceria-zirconia based composite oxide by selectively substituting Ce sites. The present inventors speculate that this enables the rare-earth element to penetrate into a region deeper from the surface of each primary particle than in conventional cases, so that a ceria-zirconia based composite oxide can be obtained which contains the rare-earth elements not only in the near-surface upper-layer region extending from the surface of each primary particle to a depth of 50 nm in the primary particle, but also in the near-surface lower-layer region extending from a depth of 50 nm to a depth of 100 nm in the primary particle in their respective predetermined amounts.

In addition, the rare-earth element generally forms a cation having a valence of +3. When such a rare-earth element substitutes Ce sites, which generally have a valence of +4, in a ceria-zirconia based composite oxide, oxygen defects are formed regularly by the electric charge compensation, so that the oxygen storage capacity (OSC) is exhibited. Here, the oxygen defects formed when the rare-earth element substitute Ce sites are more structurally stable than oxygen defects formed when the rare-earth element substitutes Zr sites. For this reason, in the oxygen storage material of the present invention in which the stable oxygen defects formed by the substitution of Ce sites with the rare-earth element are formed preferentially and down to a deeper region than in conventional cases, oxygen is more efficiently absorbed and desorbed in the primary particles through such stable oxygen defects. The present inventors speculate that, for this reason, the excellent low-temperature oxygen storage capacity (low-temperature OSC) is exhibited from a low temperature of about 300° C.

In addition, the pyrochlore phase ($Ce_2Zr_2O_7$) of $CeO_2$—$ZrO_2$ in the ceria-zirconia based composite oxide expresses the OSC by undergoing a phase transition to and from the κ phase depending on the partial pressure of oxygen in the vapor phase. When the ceria-zirconia based composite oxide having the $Ce_2Zr_2O_7$-type pyrochlore phase is exposed to an oxidizing atmosphere at high temperature, the structure of the ceria-zirconia based composite oxide returns from the $Ce_2Zr_2O_7$-type pyrochlore phase, which is a metastable state, to the fluorite structure, where this returning starts at the surface of each primary particle, so that the OSC is lowered. On the other hand, the $RE_2Zr_2O_7$-type pyrochlore structure formed by the rare-earth element (RE) ions and zirconium ions is a stable phase, and hence more excellent in heat resistance than the $Ce_2Zr_2O_7$-type pyrochlore structure. In the oxygen storage material of the present invention, an ordered phase having such a $RE_2Zr_2O_7$-type pyrochlore structure is formed preferentially and down to a deeper region than in conventional cases in the near-surface region of the primary particle. The present inventors speculate that this suppresses the phase transformation of the pyrochlore structure of $CeO_2$—$ZrO_2$, so that the heat resistance against high temperature is improved, the ratio of the superlattice structure retained is increased, and the low-temperature activity of the oxygen storage capacity is sufficiently maintained even after exposure to exhaust gas at a high temperature of about 1100° C. for a long period.

According to the present invention, it is possible to provide an oxygen storage material having both an excellent low-temperature oxygen storage capacity (low-temperature OSC) and an excellent high-temperature durability such that the excellent oxygen storage capacity (OSC) is exhibited from a low-temperature of about 300° C., and the low-temperature activity of the oxygen storage capacity is sufficiently maintained even after exposure to exhaust gas at a high temperature of about 1100° C. for a long period, as well as a method for producing the oxygen storage material.

DETAILED DESCRIPTION OF THE PREFERRED EMBODIMENTS

Hereinafter, the present invention will be described in detail based on preferred embodiments thereof.

First, an oxygen storage material of the present invention is described. Specifically, the oxygen storage material of the present invention is an oxygen storage material including a ceria-zirconia based composite oxide containing a composite oxide of ceria and zirconia, wherein the ceria-zirconia based composite oxide comprises at least one rare-earth element selected from the group consisting of lanthanum, yttrium, and neodymium, and an amount of the rare-earth element(s) contained in total is 1 to 10% by atom in terms of element relative to a total amount of cerium and zirconium in the ceria-zirconia based composite oxide, 60 to 85% by atom of the entire amount of the rare-earth element(s) is contained in a near-surface upper-layer region extending from a surface of each primary particle of the ceria-zirconia based composite oxide to a depth of 50 nm in the primary particle, and 15 to 40% by atom of the entire amount of the rare-earth element(s) is contained in a near-surface lower-layer region extending from a depth of 50 nm to a depth of 100 nm in the primary particle, a content ratio of cerium and zirconium in the ceria-zirconia based composite oxide is in a range of 40:60 to 60:40 in terms of an atomic ratio ([Ce]:[Zr]), and the ceria-zirconia based composite oxide has an intensity ratio {I(14/29) value} between a diffraction line at 2θ=14.5° and a diffraction line at 2θ=29° which satisfies the following condition:

$I(14/29)$ value≥0.032, where the intensity ratio {I(14/29) value} is determined from an X-ray diffraction pattern using CuKα obtained by an X-ray diffraction measurement conducted after heating in air under a temperature condition of 1100° C. for 5 hours.

The ceria-zirconia based composite oxide constituting the oxygen storage material of the present invention comprises at least one rare-earth element selected from the group consisting of lanthanum (La), yttrium (Y), and neodymium (Nd) as a surface additive element, and the amount of the rare-earth element(s) (surface additive element(s)) contained needs to be 1 to 10% by atom in terms of element, and is more preferably 1 to 5% by atom, relative to a total amount of cerium and zirconium in the ceria-zirconia based composite oxide. When the rare-earth element(s) (surface additive element(s)) is present in the near-surface region of the primary particles of the ceria-zirconia based composite oxide as described later, an excellent OSC is expressed from low temperature, and also the low-temperature activity of OSC is sufficiently maintained even after exposure to high-temperature exhaust gas for a long period. Accordingly, if the content ratio of the rare-earth element(s) is less than the lower limit, the expression of low-temperature OSC and the improvement in high-temperature durability owing to the rare-earth element(s) are not sufficiently obtained. Meanwhile, if the content ratio of the rare-earth element(s) exceeds the upper limit, the amount of cerium and zirconium in the near-surface region of the primary particles is relatively small, and the low-temperature OSC and the high-temperature durability are rather lowered. Note that one of these rare-earth elements may be used alone, or two or more thereof may be used in combination.

In addition, the rare-earth element(s) in the ceria-zirconia based composite oxide according to the present invention is present in a state of being, for example, solid-dissolved or dispersed in the ceria-zirconia based composite oxide. In particular, to achieve the expression of the effect of the present invention more effectively by the rare-earth element(s), it is preferable that at least part of the rare-earth element(s) be solid-dissolved in the ceria-zirconia based composite oxide, it is more preferable that 50% by atom or more of the rare-earth element(s) be solid-dissolved in the ceria-zirconia based composite oxide, and it is particularly preferable that 90% by atom or more of the rare-earth element(s) be solid-dissolved in the ceria-zirconia based composite oxide.

Moreover, in the ceria-zirconia based composite oxide according to the present invention, it is necessary that 60 to 85% by atom of the entire amount of the rare-earth element(s) be contained in a near-surface upper-layer region extending from a surface of each primary particle of the ceria-zirconia based composite oxide to a depth of 50 nm in the primary particle, and it is more preferable that 64 to 80% by atom of the entire amount of the rare-earth element(s) be contained in the near-surface upper-layer region. If the content ratio of the rare-earth element(s) in the near-surface upper-layer region is less than the lower limit, the OSC and the high-temperature durability owing to the presence of the rare-earth elements(s) in the near-surface upper-layer region are not sufficiently obtained. Meanwhile, if the content ratio of the rare-earth element(s) in the near-surface upper-layer region exceeds the upper limit, the amount of the rare-earth element(s) present in the near-surface lower-layer region described later is relatively small, so that the expression of low-temperature OSC and the further improvement in high-temperature durability owing to the presence of the rare-earth element(s) in the near-surface lower-layer region are not sufficiently obtained.

Moreover, in the ceria-zirconia based composite oxide according to the present invention, it is necessary that 15 to 40% by atom of the entire amount of the rare-earth element(s) be contained in the near-surface lower-layer region extending from a depth of 50 nm to a depth of 100 nm in the primary particles of the ceria-zirconia based composite oxide, and it is more preferable that 20 to 36% by atom of the entire amount of the rare-earth element(s) be contained in the near-surface lower-layer region. If the content ratio of the rare-earth element(s) in the near-surface lower-layer region is less than the lower limit, the expression of low-temperature OSC and the further improvement in high-temperature durability owing to the presence of the rare-earth element(s) in the near-surface lower-layer region are not sufficiently obtained. Meanwhile, if the content ratio of the rare-earth element(s) in the near-surface lower-layer region exceeds the upper limit, the amount of the rare-earth element(s) present in the above-described near-surface upper-layer region is relatively small, so that the OSC and the high-temperature durability owing to the presence of the rare-earth elements(s) in the near-surface upper-layer region are rather lowered.

In addition, in the ceria-zirconia based composite oxide according to the present invention, it is preferable that 80% by atom or more of the entire amount of the rare-earth element (s) be contained in a near-surface region extending from the surface of each primary particle of the ceria-zirconia based composite oxide to a depth of 100 nm in the primary particle, and it is more preferable that 90% by atom or more of the entire amount of the rare-earth element(s) be contained in the near-surface region. If the content ratio of the rare-earth element(s) in the near-surface region is less than the lower limit, the amount of the rare-earth element(s) present in a region deeper than the near-surface region increases relatively, so that the structural stability of the surface of the particles tends to be lowered.

In the present invention, the content ratio of the rare-earth element(s) contained in each of the near-surface upper-layer region, the near-surface lower-layer region, and the near-surface region of the ceria-zirconia based composite oxide is determined by the following method.

Figure 1:
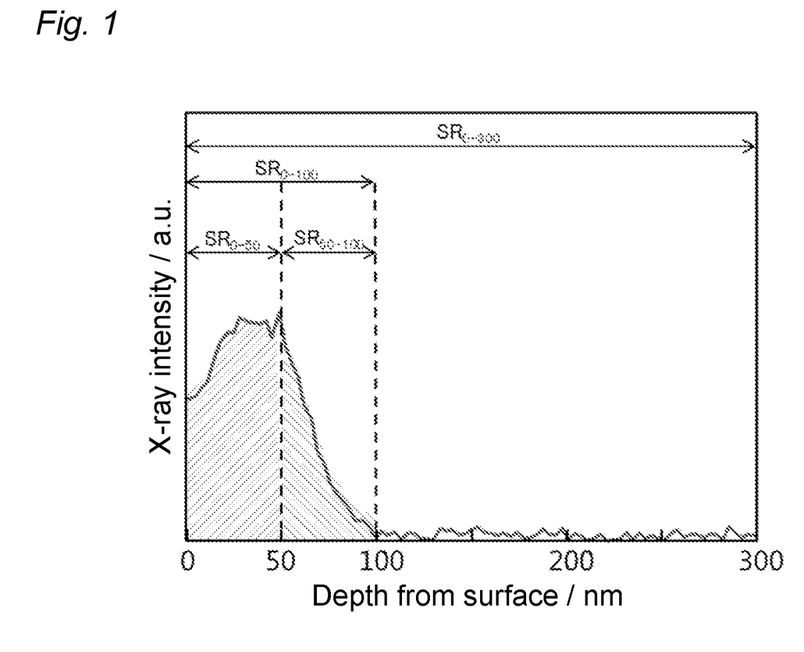
FIG. 1 is a graph showing an example of an X-ray intensity distribution of a measurement target element in a range from the surface of a primary particle to a depth of 300 nm.

Specifically, first, five or more primary particles are extracted at random from a composite oxide powder to be tested, and a micro sample including a portion to be analyzed (a cross-section including the near-surface region of the particle) is taken out of each primary particle by using an FIB (focused ion beam) processing apparatus (manufactured by Hitachi High-Technologies Corporation, trade name: NB5000). Next, each primary particle is subjected to a line analysis in 5 or more randomly selected regions extending from the surface to a depth of 300 nm by using a TEM-EDX system in which a scanning transmission electron microscope equipped with a spherical aberration corrector (Cs-STEM, manufactured by Hitachi High-Technologies Corporation, trade name: HD-2700) is equipped with an energy-dispersive X-ray detector (EDX, manufactured by EDAX, trade name: TEAM). Then, on the basis of the results of the line analyses (EDX analysis values for each of the measurement target elements), a graph (X-ray intensity distribution diagram) is created which shows an X-ray intensity distribution of the measurement target element in a range from the surface of the particle to a depth of 300 nm in the primary particle. FIG. 1 shows an example of the thus obtained X-ray intensity distribution diagram. Such an X-ray intensity distribution diagram is equivalent to a graph showing the distribution of the concentration of a measurement target element in the entire analyzed region of each line analysis. Note that, in FIG. 1, "$SR_{50-100}$" indicates a near-surface region extending from the surface to a depth of 100 nm, "$SR_{0-50}$" indicates a near-surface upper-layer region extending from the surface to a depth of 50 nm, "$SR_{50-100}$" indicates a near-surface lower-layer region extending from a depth of 50 nm to a depth of 100 nm, and "$SR_{0-300}$" indicates the entire analyzed region extending from the surface to a depth of 300 nm.

On the basis of the thus obtained X-ray intensity distribution diagram, a cumulative X-ray intensity value of the measurement target element is determined for each region, and the content ratio ($RE_{0-50}$) of the measurement target element (RE) in the near-surface upper-layer region ($SR_{0-50}$), the content ratio ($RE_{50-100}$) of the measurement target element (RE) in the near-surface lower-layer region ($SR_{50-100}$), and the content ratio ($RE_{0-100}$) of the measurement target element (RE) in the near-surface region ($SR_{0-100}$) are respectively calculated according to the following mathematical expressions (1) to (3):

$RE_{0-50}[\%]=\{$(cumulative X-ray intensity value [a.u.] of RE in $SR_{0-50}$)/(cumulative X-ray intensity value [a.u.] of RE in $SR_{0-300}$)$\}\times 100$     Expression (1):

$RE_{50-100}[\%]=\{$(cumulative X-ray intensity value [a.u.] of RE in $SR_{50-100}$)/(cumulative X-ray intensity value [a.u.] of RE in $SR_{0-300}$)$\}\times 100$     Expression (2):

$RE_{0-100}[\%]=\{$(cumulative X-ray intensity value [a.u.] of RE in $SR_{0-100}$)/(cumulative X-ray intensity value [a.u.] of RE in $SR_{0-300}$)$\}\times 100$.     Expression (3):

Then, an average value of the values determined from all the line analysis results of all the extracted primary particles is determined. Thus, the content ratio of the rare-earth element(s) contained in each of the near-surface upper-layer region, the near-surface lower-layer region, and the near-surface region of the ceria-zirconia based composite oxide, which is the measurement target, is obtained. Note that since no rare-earth element(s) is substantially present in a region beyond a depth of 300 nm from the surface of each primary particle in the ceria-zirconia based composite oxide according to the present invention, the cumulative X-ray intensity value of RE in $SR_{0-300}$ is substantially equivalent to the entire amount of the measurement target element (RE) contained in the primary particles.

Moreover, in the ceria-zirconia based composite oxide according to the present invention, the content ratio of cerium and zirconium, which are main component elements, needs to be in a range of 40:60 to 60:40 in terms of atomic ratio ([Ce]:[Zr]), and is more preferably in the range from 43:57 to 48:52. If the content ratio of cerium is less than the lower limit, the lowering in oxygen storage capacity resulting from the composition rich in zirconium surpasses the effect of improving the stability of the composite oxide achieved by the suppression of the phase separation of ceria, which results in an insufficient oxygen storage capacity after a high-temperature durability test. Meanwhile, if the content ratio of cerium exceeds the upper limit, the effect of improving the stability of the composite oxide cannot be obtained by the suppression of the phase separation of ceria, which results in an insufficient oxygen storage capacity after a high-temperature durability test.

In addition, the primary particles of the ceria-zirconia based composite oxide according to the present invention have an average particle diameter of preferably 2.2 to 4.5 µm, more preferably 2.5 to 4.5 µm, and particularly preferably 2.5 to 4.0 µm. If the average particle diameter of the primary particles is less than the lower limit, the heat resistance of the $CeO_2$—$ZrO_2$ pyrochlore structure tends to be lowered. Meanwhile, if the average particle diameter of the primary particles exceeds the upper limit, the release of oxygen tends to take too much time.

Note that the average particle diameter of primary particles of the ceria-zirconia based composite oxide in the present invention is measured by observing the primary particles under a scanning electron microscope (SEM), measuring the particle diameters of 50 randomly selected primary particles, and calculating the average value of the particle diameters. Note that when the cross-section is not circular, the diameter of the smallest circumcircle is taken as the particle diameter.

In addition, the particle diameters of primary particles, their respective compositions and structures, and further the aggregation state of secondary particles, and the like can be checked by observation or analyses of the ceria-zirconia based composite oxide by using an appropriate combination of any ones of an SEM (scanning electron microscope), a TEM (transmission electron microscope), an HR-TEM (high-resolution transmission electron microscope), an FE-STEM (field emission-scanning transmission electron microscope), an EDX (energy-dispersive X-ray detector), an XPS (photoelectron spectrometer), and the like.

Moreover, in the ceria-zirconia based composite oxide according to the present invention, an intensity ratio {I(14/29) value} between a diffraction line at $2\theta=14.5°$ and a diffraction line at $2\theta=29°$ determined from an X-ray diffraction pattern using CuKα obtained by an X-ray diffraction measurement conducted after heating in air under a temperature condition of 1100° C. for 5 hours needs to be 0.032 or higher, and is more preferably 0.033 or higher. If the I(14/29) value is lower than the lower limit, the ratio of the ordered phase maintained is so low that the resultant oxygen storage capacity after a high-temperature durability test is insufficient. An upper limit of the I(14/29) value is not particularly limited, and is preferably 0.05 or lower from the viewpoint that the I(14/29) value of the pyrochlore phase calculated from the PDF card (01-075-2694) is the upper limit.

Note that, for the X-ray diffraction (XRD) measurement, a method can be employed in which the measurement is conducted by using a measuring instrument manufactured by Rigaku Corporation under the trade name of "RINT-Ultima" and using Cu Kα radiation under conditions of 40 KV, 40 mA, and $2\theta=5°$/min. In addition, a "peak" of a diffraction line refers to one whose height from the baseline to the peak top is 30 cps or higher.

Here, the diffraction line at $2\theta=14.5°$ is a diffraction line assigned to the (111) plane of an ordered phase (κ phase), and the diffraction line at $2\theta=29°$ is one in which a diffraction line assigned to the (222) plane of the ordered phase overlaps with a diffraction line assigned to the cubic crystal phase (111) plane of the ceria-zirconia solid solution (CZ solid solution). Hence, the I (14/29) value, which is the intensity ratio between the two diffraction lines, is calculated, and provided as an index indicative of the ratio of the ordered phase retained (the ratio of the ordered phase present). Note that, when a diffraction line intensity is determined, the calculation is made by subtracting the average diffraction line intensity over $2\theta=10°$ to $12°$, which serves as a background value, from the value of the intensity of the diffraction line. In addition, completely ordered phases include the κ phase ($Ce_2Zr_2O_8$) where oxygen is completely packed, and the pyrochlore phase ($Ce_2Zr_2O_7$) where oxygen completely comes off. When calculations are made using their respective PDF cards (PDF2: 01-070-4048 for the κ phase, and PDF2: 01-075-2694 for the pyrochlore phase), the I(14/29) value of the κ phase is 0.04, and the I(14/29) value of the pyrochlore phase is 0.05. In addition, an ordered phase, i.e., a crystal phase having a regularly arranged structure formed by cerium ions and zirconium ions is a crystal arrangement structure (a regularly arranged phase of a φ phase (the same phase as the κ phase) type: a superlattice structure occurring in the fluorite structure) having peaks at positions at $2\theta$ angles of 14.5°, 28°, 37°, 44.5°, and 51° in an X-ray diffraction pattern using CuKα obtained by the X-ray diffraction measurement.

In the ceria-zirconia based composite oxide according to the present invention, the content ratio of the ordered phases (the $Ce_2Zr_2O_7$-type pyrochlore phase and the $RE_2Zr_2O_7$-type pyrochlore phase) determined by the peak intensity ratio of the X-ray diffraction pattern relative to all the crystal phases is preferably 50 to 100%, and more preferably 80 to 100%. If the content ratio of the ordered phases is less than the lower limit, the deterioration-prevention effect and heat resistance of the oxygen storage material of the composite oxide tend to be lowered. Note that, of the above-described ordered phases, the content ratio of the ordered phase having the $RE_2Zr_2O_7$-type pyrochlore structure is preferably 0.1 to 8.0%, and more preferably 0.8 to 5.0%. If the content ratio of the ordered phase having the $RE_2Zr_2O_7$-type pyrochlore structure is less than the lower limit, the deterioration-prevention effect and the heat resistance tend to be lowered. Meanwhile, if the content ratio exceeds the upper limit, the oxygen storage capacity tends to be lowered.

Moreover, the specific surface area of the ceria-zirconia based composite oxide according to the present invention is not particularly limited, and is preferably 0.01 to 20 $m^2/g$. If the specific surface area is less than the lower limit, the interaction with a noble metal tends to be weak, and the oxygen storage capacity tends to be low. Meanwhile, if the specific surface area exceeds the upper limit, particles having small particle diameters tend to increase, and the heat resistance tends to be lowered. Note that the specific surface area can be calculated as a BET specific surface area from an adsorption isotherm by using the BET adsorption isotherm equation.

Moreover, the ceria-zirconia based composite oxide according to the present invention may further comprise at least one additive element selected from the group consisting of rare-earth elements other than cerium, lanthanum, yttrium, and neodymium, and alkaline earth elements. When such an additive element is contained, a higher exhaust gas purification ability tends to be exhibited in a case where the ceria-zirconia based composite oxide according to the present invention is used as a support for a catalyst for purification of exhaust gas. Examples of the rare-earth elements other than cerium, lanthanum, yttrium, and neodymium include praseodymium (Pr), scandium (Sc), samarium (Sm), gadolinium (Gd), terbium (Tb), dysprosium (Dy), ytterbium (Yb), lutetium (Lu), and the like, of which Pr and Sc are preferable, and Pr is more preferable from the viewpoint that when a noble metal is supported, the interaction with the noble metal tends to be strong, so that the affinity tends to be high. Meanwhile, examples of the alkaline earth metals include magnesium (Mg), calcium (Ca), strontium (Sr), barium (Ba), and radium (Ra), of which Mg, Ca, and Ba are preferable from the viewpoint that when a noble metal is supported, the interaction with the noble metal tends to be strong, so that the affinity tends to be high. The rare-earth elements other than cerium, lanthanum, yttrium, and neodymium, and alkaline earth metal elements, which have low electronegativity, strongly interact with a noble metal, and hence tend to be bound to the noble metal through oxygen in an oxidizing atmosphere, inhibit sublimation and sintering of the noble metal, and be capable of sufficiently suppressing degradation of the noble metal, which is an active site for the purification of exhaust gas.

Moreover, when the additive element(s) is contained, the amount of the additive element(s) contained in total is preferably 1 to 20% by atom and more preferably 2 to 7% by atom in terms of element relative to the total amount of cerium (Ce) and zirconium (Zr) in the ceria-zirconia based composite oxide. If the amount of the additive element(s) contained is less than the lower limit, in a case where a noble metal is supported on the obtained composite oxide, it tends to be difficult to sufficiently improve the interaction with the noble metal. Meanwhile, if the amount of the additive element(s) contained exceeds the upper limit, the oxygen storage capacity tends to be lowered.

As described above, the oxygen storage material of the present invention includes the ceria-zirconia based composite oxide, and expresses an excellent oxygen storage capacity (OSC) from a low temperature of about 300° C., and also sufficiently maintains the low-temperature activity of the oxygen storage capacity even after exposure to exhaust gas at a high temperature of about 1100° C. for a long period. For this reason, the oxygen storage material of the present invention is preferably used as a support or auxiliary catalyst for a catalyst for purification of exhaust gas. A preferred example of the use of such an oxygen storage material of the present invention may be a catalyst for purification of exhaust gas comprising a support comprising the oxygen storage material of the present invention; and a noble metal supported on the support. Examples of the noble metal include platinum, rhodium, palladium, osmium, iridium, gold, silver, and the like. In addition, another example is one in which the oxygen storage material of the present invention is arranged around a catalyst for purification of exhaust gas in which a noble metal is supported on other catalyst support fine particles.

Next, a method of the present invention for producing the above-described oxygen storage material of the present invention is described. The method for producing an oxygen storage material including a ceria-zirconia based composite oxide of the present invention comprises the steps of:

preparing a ceria-zirconia based composite oxide powder having a content ratio of cerium and zirconium in a range of 40:60 to 60:40 in terms of atomic ratio ([Ce]:[Zr]);

causing the composite oxide powder obtained in the preparing step to support at least one rare-earth element selected from the group consisting of lanthanum, yttrium, and neodymium such that an amount of the rare-earth element(s) contained in total is 1 to 10% by atom in terms of element relative to a total amount of cerium and zirconium in the ceria-zirconia based composite oxide; and subjecting the ceria-zirconia based composite oxide powder supporting the rare-earth element(s) to a reduction treatment under a reducing atmosphere at 1200 to 1600° C. to obtain the oxygen storage material including the ceria-zirconia based composite oxide of the present invention.

In the method for producing an oxygen storage material of the present invention, first, a ceria-zirconia based composite oxide powder is prepared which has a content ratio of cerium and zirconium in a range of 40:60 to 60:40 in terms of atomic ratio ([Ce]:[Zr]) (ceria-zirconia based composite oxide powder preparation step).

If the amount of Ce contained in the ceria-zirconia based solid solution powder is less than the lower limit, it is difficult for the obtained ceria-zirconia based composite oxide to have a sufficient OSC. Meanwhile, if the amount of Ce exceeds the upper limit, it is difficult to obtain the ceria-zirconia based composite oxide in a single phase. As the ceria-zirconia based solid solution powder, it is preferable to use a solid solution in which ceria and zirconia are mixed with each other at the atomic level from the viewpoint of forming the ordered phase more sufficiently. In addition, the primary particles of the ceria-zirconia based solid solution powder preferably have an average particle diameter of 2.2 to 4.5 μm. If the average primary particle diameter of the ceria-zirconia based solid solution powder is less than the lower limit, the heat resistance of the $CeO_2$—$ZrO_2$ pyrochlore structure tends to be lowered. Meanwhile, if the average primary particle diameter exceeds the upper limit, the release of oxygen tends to take too much time.

In addition, a method for preparing (making) the ceria-zirconia based composite oxide powder according to the present invention is not particularly limited, and examples thereof include a method in which the ceria-zirconia based composite oxide powder is obtained by preparing a ceria-zirconia based solid solution powder by a coprecipitation method or the like such that the content ratio of cerium and zirconium is within the above-describe range, and molding the ceria-zirconia based solid solution powder, followed by a heat treatment under a reduction condition, and the like.

The coprecipitation method is, for example, a method in which coprecipitates are formed by using an aqueous solution containing a cerium salt (for example, nitrate) and a zirconium salt (for example, nitrate) in the presence of ammonia, the obtained coprecipitates are filtered, washed, then dried, and further calcined, and then pulverized by using a pulverizer such as a ball mill to obtain the ceria-zirconia based solid solution powder. Note that an aqueous solution containing the cerium salt and the zirconium salt is prepared such that the content ratio of cerium and zirconium in the obtained solid solution powder can be within the predetermined range. In addition, if necessary, a salt of at least one additive element selected from the group consisting of rare-earth elements other than cerium, lanthanum, yttrium, and neodymium and alkaline earth elements, a surfactant (for example, a nonionic surfactant), and the like may be added to the aqueous solution.

In addition, a method for molding the ceria-zirconia based solid solution powder may be a method in which the ceria-zirconia based solid solution powder is pressure molded under a pressure of 400 to 3500 $kgf/cm^2$ (more preferably a pressure of 500 to 3000 $kgf/cm^2$). If the pressure in the pressure-molding step is lower than the lower limit, the packing density of the powder is not improved sufficiently. Hence, the crystal growth during the reduction treatment is not promoted sufficiently, and the oxygen storage capacity of the resultant ceria-zirconia based composite oxide after a high-temperature durability test tends to be insufficient. Meanwhile, if the pressure in the pressure molding step exceeds the upper limit, the phase separation of ceria easily progresses, and the oxygen storage capacity of the resultant ceria-zirconia based composite oxide after a high-temperature durability test tends to be insufficient. Note that a method for the pressure molding is not particularly limited, and a known pressure molding method such as isostatic pressing can be employed, as appropriate.

Moreover, a method for conducting the heat treatment under a reduction condition may be a method in which the ceria-zirconia based composite oxide powder is obtained by subjecting the ceria-zirconia based solid solution powder molded article obtained by the above-described pressure molding to a reduction treatment which is a heat treatment under a reduction condition at a temperature of 1450 to 2000° C. (preferably 1600 to 1900° C.) for 0.5 to 24 hours (preferably 1 to 10 hours). If the temperature for the reduction treatment is lower than the lower limit, the stability of the ordered phase tends to be low, and the oxygen storage capacity of the resultant ceria-zirconia based composite oxide after a high-temperature durability test tends to be insufficient. Meanwhile, if the temperature for the reduction treatment exceeds the upper limit, the energy (for example, electric power) required for the reduction treatment and the improvement in performance tend to be put out of balance. In addition, if the heating time for the reduction treatment is less than the lower limit, the formation of the ordered phase tends to be insufficient. Meanwhile, if the heating time exceeds the upper limit, the energy (for example, electric power) required for the reduction treatment and the improvement in performance tend to be put out of balance.

In addition, a method for the reduction treatment is not particularly limited, as long as the method enables a heat treatment on the solid solution powder under a reducing atmosphere and under a predetermined temperature condition. Examples thereof include (i) a method in which the reduction treatment is conducted by placing the powder in a vacuum heating furnace, evacuating the furnace, and then allowing a reducing gas to flow into the furnace to create a reducing atmosphere in the furnace, followed by heating under a predetermined temperature condition; (ii) a method in which the reduction treatment is conducted by using a graphite furnace, placing the powder in the furnace, and evacuating the furnace, followed by heating under a predetermined temperature condition to create a reducing atmosphere of reducing gases such as CO and HC generated from the furnace body, a fuel for heating, or the like in the furnace; and (iii) a method in which the reduction treatment is conducted by placing the powder in a crucible filled with activated carbon, followed by heating under a predetermined temperature condition to create a reducing atmosphere of reducing gases such as CO and HC generated from the activated carbon and the like in the crucible.

The reducing gas used to achieve the reducing atmosphere is not particularly limited, and it is possible to use, as appropriate, a reducing gas such as CO, HC, $H_2$, and other hydrocarbon gases. Moreover, of these reducing gases, it is more preferable to use one not containing carbon from the viewpoint of preventing the formation of by-products such as zirconium carbide (ZrC). When such a reducing gas not containing carbon (C) is used, the reduction treatment can be conducted under a higher temperature condition, which is close to the melting point of zirconium or the like, so that the structural stability of the crystal phase can be improved sufficiently.

Moreover, after the reduction treatment, the ceria-zirconia based composite oxide powder is preferably further subjected to an oxidation treatment. By conducting the oxidation treatment, oxygen lost during the reduction tends to be compensated in the obtained ceria-zirconia based composite oxide powder, and the stability as an oxide powder tends to be improved. A method for the oxidation treatment is not particularly limited, and, for example, a method can be preferably employed in which the ceria-zirconia based composite oxide powder is subjected to a heat treatment under an oxidizing atmosphere (for example, in air). In addition, a heating temperature condition for the oxidation treatment is not particularly limited, and is preferably about 300 to 800° C. Moreover, the heating time for the oxidation treatment is not particularly limited, either, and is preferably about 0.5 to 10 hours.

In addition, after the reduction treatment or the oxidation treatment, the ceria-zirconia based composite oxide powder is preferably further subjected to a pulverization treatment. A method for the pulverization treatment is not particularly limited, and, for example, a wet pulverization method, a dry pulverization method, a freeze pulverization method, or the like can be preferably employed.

In the method for producing an oxygen storage material of the present invention, next, the composite oxide powder obtained in the ceria-zirconia based composite oxide powder preparation step is caused to support at least one rare-earth element selected from the group consisting of lanthanum, yttrium, and neodymium such that an amount of the rare-earth element(s) contained in total is 1 to 10% by atom in terms of element relative to a total amount of cerium and zirconium in the ceria-zirconia based composite oxide (rare-earth element supporting step).

In the present invention, the rare-earth element (RE) supported as a surface additive element on the ceria-zirconia based composite oxide powder needs to be at least one selected from the group consisting of lanthanum (La), yttrium (Y), and neodymium (Nd). The rare-earth element (RE) may be one of these elements, or a combination of two or more of the rare-earth elements may be supported on the ceria-zirconia based composite oxide powder. The rare-earth element (RE) supported on the ceria-zirconia based composite oxide powder enables the obtained ceria-zirconia based composite oxide to have both a sufficiently excellent oxygen storage capacity and a sufficiently excellent heat resistance at high levels, and also exhibit a sufficiently excellent oxygen storage capacity even after exposure to high temperature for a long period. The rare-earth element (RE) is preferably lanthanum (La).

The amount of the rare-earth element (RE) supported needs to be such an amount that the amount of the rare-earth element (s) (RE) contained in total in the obtained ceria-zirconia based composite oxide can be 1 to 10% by atom in terms of element relative to the total amount of cerium and zirconium in the ceria-zirconia based composite oxide, and is preferably such an amount that the amount can be 1 to 7.5% by atom. If the content ratio of the rare-earth element (RE) is less than the lower limit, the expression of low-temperature OSC and the improvement in high-temperature durability owing to the rare-earth element are not obtained sufficiently. Meanwhile, if the content ratio of the rare-earth element (RE) exceeds the upper limit, the amount of cerium and zirconium in the near-surface region of the primary particles is relatively small, so that the low-temperature OSC and the high-temperature durability are rather lowered.

A method for causing the ceria-zirconia based composite oxide powder to support the rare-earth element (RE) is not particularly limited, and a known method can be employed, as appropriate. For example, a liquid phase method such as a commonly used impregnation supporting method, an ion exchange method (adsorption supporting method or the like), a water-absorption supporting method, a sol-gel method, or a precipitation supporting method (coprecipitation method or the like), a solid phase method such as a powder mixing method or a solid phase ion exchange method, or a vapor phase method such as a CVD method is used, and the supporting method is not particularly limited thereto. Note that since the raw material is readily available, it is preferable to use the impregnation supporting method, the water-absorption supporting method, or the ion exchange method. It is also preferable to use the water-absorption method in which the amount of water absorbed by the powder is measured in advance, and the powder is allowed to absorb a raw material solution in which a necessary amount of the rare-earth element (RE) is dissolved, whereby the additive element can be prevented from being diffused into the particles.

A raw material (rare-earth element source) for the rare-earth element (RE) supported in the present invention is not particularly limited, and it is possible to use a salt, a complex, a simple substance, an oxide, or the like of the rare-earth element. The rare-earth element (RE) source can be selected, as appropriate, according to the supporting method, the supporting conditions, and the like. Specifically, a salt of a rare-earth element (RE) to be supported is preferably used, and it is possible to use, for example, an inorganic acid salt such as a nitric acid salt, a sulfuric acid salt, or a hydrochloric acid salt, or an organic acid salt such as an acetic acid salt. The rare-earth element (RE) source may be either soluble or insoluble in a dispersion medium.

In a specific example of the supporting of the rare-earth element (RE), first, an aqueous solution (for example, an aqueous lanthanum nitrate solution, an aqueous yttrium nitrate solution, an aqueous neodymium nitrate solution, or the like) is prepared in which a salt or the like of the rare-earth element (RE) is dissolved. Next, the ceria-zirconia based composite oxide powder is mixed with the aqueous solution containing the rare-earth element (RE), and impregnated with the rare-earth element (RE) by stirring at a predetermined temperature for a predetermined time. Subsequently, the ceria-zirconia based composite oxide powder impregnated with the rare-earth element (RE) is subjected to filtration, washing, drying, and the like to obtain a rare-earth element (RE)-impregnated ceria-zirconia based composite oxide according to the present invention.

In another specific example of the supporting of the rare-earth element (RE), first, a liquid dispersion of the ceria-zirconia based composite oxide powder is prepared. For example, the ceria-zirconia based composite oxide powder is suspended in ion-exchanged water to obtain the liquid dispersion. Next, an aqueous solution of a rare-earth element (RE) compound (for example, lanthanum nitrate or the like) is prepared, and mixed with the liquid dispersion of the ceria-zirconia based composite oxide powder to prepare a mixed liquid dispersion of the ceria-zirconia based composite oxide powder and the rare-earth element (RE) compound. Subsequently, the mixed liquid dispersion is subjected to spray drying, washing, drying, and the like to obtain a rare-earth element (RE)-impregnated ceria-zirconia based composite oxide according to the present invention.

Note that conditions for the drying and the like are not particularly limited, and known conditions can be employed, as appropriate. For example, as the drying conditions, heating conditions at 100 to 400° C. for about 1 to 12 hours may be employed.

In the method for producing an oxygen storage material of the present invention, next, the ceria-zirconia based composite oxide powder supporting the rare-earth element(s) (surface additive element(s)) is subjected to a reduction treatment under a reducing atmosphere at 1200 to 1600° C. to obtain the oxygen storage material including the ceria-zirconia based composite oxide of the present invention (reduction treatment step).

In the reduction treatment step in the production method of the present invention, the calcination temperature needs to be in the range of 1200 to 1600° C., and is more preferably 1300 to 1500° C. If the calcination temperature is lower than the lower limit, it is difficult for the rare-earth element to penetrate into a deeper region beyond a depth of 50 nm from the surface of each primary particle of the ceria-zirconia based composite oxide, so that the expression of low-temperature OSC and the improvement in high-temperature durability are not obtained sufficiently. Meanwhile, if the calcination temperature exceeds the upper limit, the energy required for the reduction treatment and the improvement in performance are put out of balance.

In addition, a method for the reduction treatment in the reduction treatment step is not particularly limited, as long as the method enables the heat treatment to be performed on the ceria-zirconia based composite oxide powder supporting the rare-earth element under a reducing atmosphere and under the temperature condition. Examples thereof include (i) a method in which the reduction treatment is conducted by placing the powder in a vacuum heating furnace, evacuating the furnace, and then allowing a reducing gas to flow into the furnace to create a reducing atmosphere in the furnace, followed by heating under a predetermined temperature condition; (ii) a method in which the reduction treatment is conducted by using a graphite furnace, placing the powder in the furnace, and evacuating the furnace, followed by heating under a predetermined temperature condition to create a reducing atmosphere of reducing gases such as CO and HC generated from the furnace body, a fuel for heating, or the like in the furnace; and (iii) a method in which the reduction treatment is conducted by placing the powder in a crucible filled with activated carbon, followed by heating under a predetermined temperature condition to create a reducing atmosphere of reducing gases such as CO and HC generated from the activated carbon and the like in the crucible.

The reducing gases used to achieve the reducing atmosphere are not particularly limited, and it is possible to use, as appropriate, a reducing gas such as CO, HC, $H_2$, and other hydrocarbon gases. Of these reducing gases, it is more preferable to use one not containing carbon (C), from the viewpoint of preventing the formation of by-products such as zirconium carbide (ZrC).

Moreover, the time for which the heat treatment is conducted under the temperature condition in the reduction treatment step is not particularly limited, and is preferably about 0.5 to 24 hours, and more preferably about 1 to 10 hours. If the time for the reduction treatment is less than the lower limit, the rare-earth element does not sufficiently penetrate into a deeper region beyond a depth of 50 nm from the surface of each primary particle of the ceria-zirconia based composite oxide, so that it tends to be difficult to sufficiently obtain the expression of low-temperature OSC and the improvement in high-temperature durability. Meanwhile, if the time for the reduction treatment exceeds the upper limit, the inputted electric power and the improvement in performance tend to be put out of balance.

In addition, the method for producing an oxygen storage material of the present invention preferably further comprises, before the reduction treatment, a step of subjecting the ceria-zirconia based composite oxide powder supporting the rare-earth element(s) to an oxidation treatment under an oxidizing atmosphere at 300 to 800° C. (pre-reduction oxidation treatment step). By conducting the oxidation treatment before the reduction treatment as described above, the supported precursor of the rare-earth element is decomposed, and the rare-earth element tends to be easily solid-dissolved during the subsequent reduction treatment.

Moreover, the method for producing an oxygen storage material of the present invention preferably further comprises, after the reduction treatment, a step of subjecting the ceria-zirconia based composite oxide powder, which has been subjected to the reduction treatment, to an oxidation treatment under an oxidizing atmosphere at 300 to 800° C. (post-reduction oxidation treatment step). By conducting the oxidation treatment after the reduction treatment as described above, a more stable state in air tends to be achieved.

A method for the oxidation treatment in the pre-reduction oxidation treatment step and the post-reduction oxidation treatment step is not particularly limited, and, for example, a method may be preferably employed in which the powder is subjected to a heat treatment under an oxidizing atmosphere (for example, in air). In addition, the heating time for the oxidation treatment is not particularly limited, and is preferably about 0.5 to 10 hours.

In the method for producing an oxygen storage material of the present invention, the obtained ceria-zirconia based composite oxide is preferably further subjected to a pulverization treatment after the reduction treatment (after the post-reduction oxidation treatment when the post-reduction oxidation treatment is included). A method for the pulverization treatment is not particularly limited, and, for example, a wet pulverization method, a dry pulverization method, a freeze pulverization method, or the like can be preferably employed.

EXAMPLES

Hereinafter, the present invention is described more specifically on the basis of Examples and Comparative Examples; however, the present invention is not limited to Examples below.

The following reagents were used:
(1) cerium nitrate: $Ce(NO_3)_3 \cdot 6H_2O$ (purity: 99.5%, manufactured by Wako Pure Chemical Industries, Ltd.)
(2) zirconium nitrate: $ZrO(NO_3)_2 \cdot 2H_2O$ (purity: 97%, manufactured by Wako Pure Chemical Industries, Ltd.)
(3) praseodymium nitrate: $Pr(NO_3)_3 \cdot 6H_2O$ (purity: 99.9%, manufactured by Mitsuwa Chemicals Co., Ltd.)
(4) lanthanum nitrate: $La(NO_3)_3 \cdot 6H_2O$ (purity: 99.9%, manufactured by Wako Pure Chemical Industries, Ltd.)
(5) neodymium nitrate: $Nd(NO_3)_3 \cdot 6H_2O$ (purity: 99.9%, manufactured by Mitsuwa Chemicals Co., Ltd.)
(6) yttrium nitrate: $Y(NO_3)_3 \cdot 6H_2O$ (purity: 99.9%, manufactured by Wako Pure Chemical Industries, Ltd.).

Example 1

<Preparation of Pr—CZ Composite Oxide Powder>

A praseodymium-containing ceria-zirconia composite oxide powder (Pr—CZ composite oxide powder) having the composition shown in Table 1 was prepared as follows.

Specifically, first, 208.6 g of an aqueous cerium nitrate solution having a concentration of 28% by mass in terms of $CeO_2$, 283.0 g of an aqueous zirconium nitrate solution having a concentration of 18% by mass in terms of $ZrO_2$, and an aqueous solution obtained by dissolving 8.5 g of praseodymium nitrate hexahydrate in 100 ml of pure water were mixed together. The obtained mixed solution was added to a solution obtained by diluting 160.0 g of 25% ammonia water with 900 ml of pure water, followed by stirring at 300 rpm for 10 minutes by using a homogenizer (manufactured by IKA, trade name: digital ULTRA-TURRAX) to form coprecipitates. The obtained coprecipitates were centrifuged, and washed (ion-exchanged water). Next, the obtained coprecipitates were dried at 150° C. for 7 hours in air by using a degreasing furnace, and then calcined in air at 400° C. for 5 hours to obtain a praseodymium-containing ceria-zirconia solid solution (Pr—CZ solid solution). After that, the solid solution was pulverized by using a pulverizer (manufactured by AS ONE Corporation, trade name "Wonder Blender") to have particle diameters of 75 µm or less, as determined by using a sieve. Thus, a Pr—CZ solid solution powder was obtained.

Next, 20 g of the obtained Pr—CZ solid solution powder was packed in a polyethylene bag (capacity: 0.05 liters), and the inside of the bag was degassed. Then, the opening of the bag was sealed by heating. Subsequently, by using an isostatic pressing machine (manufactured by NIKKISO CO., LTD., trade name "CK4-22-60"), the bag was subjected to cold isostatic pressing (CIP) under a pressure (molding pressure) of 3000 kgf/cm$^2$ for 1 minute to conduct molding. Thus, a molded article of the Pr—CZ solid solution powder was obtained. The size of the molded article was 40 mm in length, 40 mm in width, and 7 mm in average thickness, and the weight thereof was approximately 20 g.

Subsequently, the obtained molded article was placed in a small vacuum/pressurized sintering furnace made of graphite (manufactured by Fuji Dempa Kogyo Co., Ltd., trade name "FVPS-R-150"), and the atmosphere was replaced with argon. Then, the molded article was heated to 1000° C. in a temperature rising time of 1 hour, then heated to 1700° C. (reduction treatment temperature) in a temperature rising time of 4 hours, and held at that temperature for 5 hours. After that, the molded article was cooled to 1000° C. in a cooling time of 4 hours, and then allowed to cool spontaneously to room temperature to obtain a reduction-treated article.

Then, the obtained reduction-treated article was subjected to a heat treatment in air at 500° C. for 5 hours, and then pulverized by using a pulverizer (manufactured by AS ONE Corporation, trade name "Wonder Blender") to have particle diameters of 75 μm or less, as determined by using a sieve. Thus, a praseodymium-containing ceria-zirconia composite oxide powder (Pr—CZ composite oxide powder) was obtained.

<Preparation of La/Pr—CZ Composite Oxide Powder>

Next, a lanthanum/praseodymium-containing ceria-zirconia composite oxide powder (La/Pr—CZ composite oxide powder) containing lanthanum as a surface additive element in the near-surface region and having the composition shown in Table 1 was prepared as follows.

Specifically, first, an aqueous lanthanum nitrate solution was prepared which contained lanthanum (La) at a ratio of 2.5% by atom in terms of element relative to the total amount of cerium and zirconium in the obtained Pr—CZ composite oxide powder. Subsequently, 10 g of the Pr—CZ composite oxide powder obtained as described above was introduced into the obtained aqueous lanthanum nitrate solution, followed by stirring at room temperature for 1 hour. Thus, lanthanum was supported on the Pr—CZ composite oxide powder by the water-absorption supporting method in a predetermined amount which resulted in the amount contained as shown in Table 1. After that, the La-supporting Pr—CZ composite oxide powder was separated by filtration, and dried in air at 110° C. for 12 hours.

Next, the obtained La-supporting Pr—CZ composite oxide powder was, first, calcined in air at 700° C. for 5 hours. Subsequently, the calcined La-supporting Pr—CZ composite oxide powder was placed in a small vacuum/pressurized sintering furnace made of graphite (manufactured by Fuji Dempa Kogyo Co., Ltd., trade name "FVPS-R-150"), and the atmosphere was replaced with argon. Then, the powder was heated to 1000° C. in a temperature rising time of 1 hour, then heated to 1400° C. (reduction treatment temperature) in a temperature rising time of 4 hours, and held at that temperature for 5 hours. After that, the powder was cooled to 1000° C. in a cooling time of 4 hours, and then allowed to cool spontaneously to room temperature to obtain a reduction-treated article.

Then, the obtained reduction-treated article was subjected to a heat treatment in air at 500° C. for 5 hours, and then pulverized by using a pulverizer (manufactured by AS ONE Corporation, trade name "Wonder Blender") to have particle diameters of 75 μm or less, as determined by using a sieve. Thus, a lanthanum/praseodymium-containing ceria-zirconia composite oxide powder (La/Pr—CZ composite oxide powder) containing lanthanum in the near-surface region and having the composition shown in Table 1 was obtained.

<Heat-Resistance Test>

The obtained La/Pr—CZ composite oxide powder was subjected to a heat treatment in air under conditions of 1100° C. and 5 hours to conduct a high-temperature durability test.

<Measurement of Content Ratio of Surface Additive Element in Near-Surface Region>

Figure 2:
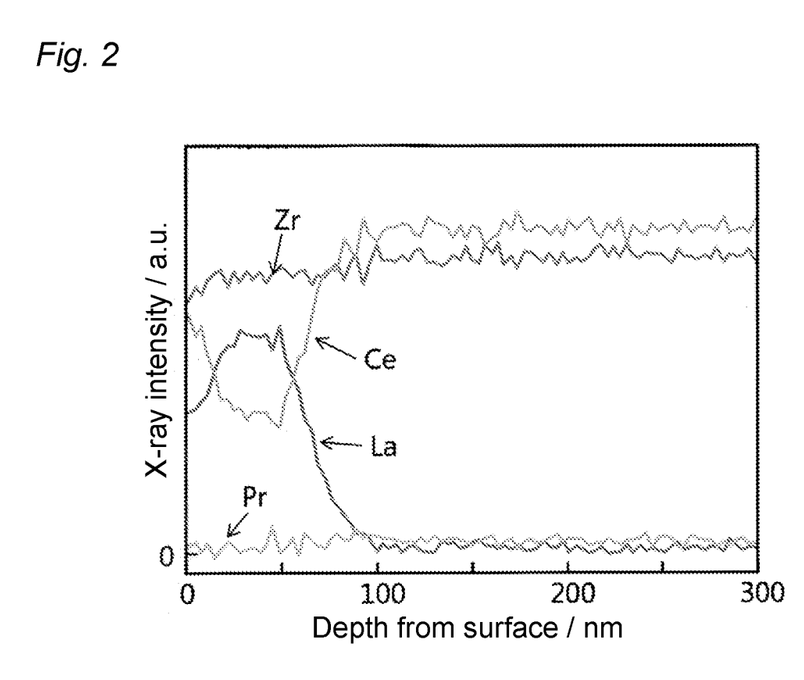
FIG. 2 is a graph showing an example of X-ray intensity distributions of Ce, Zr, La, and Pr in a range from the surface of a primary particle to a depth of 300 nm in the primary particle of a composite oxide obtained in Example 1.

First, five or more primary particles were randomly extracted from the La/Pr—CZ composite oxide powder after the heat-resistance test, and a micro sample including a portion to be analyzed (a cross-section including the near-surface region of the particle) was taken out of each primary particle by using an FIB (focused ion beam) processing apparatus (manufactured by Hitachi High-Technologies Corporation, trade name: NB5000). Next, each primary particle was subjected to a line analysis in 5 or more randomly selected regions extending from the surface to a depth of 300 nm by using a TEM-EDX system in which a scanning transmission electron microscope equipped with a spherical aberration corrector (Cs-STEM, manufactured by Hitachi High-Technologies Corporation, trade name: HD-2700) was equipped with an energy-dispersive X-ray detector (EDX, manufactured by EDAX, trade name: TEAM). Then, on the basis of the results of the line analyses, a graph (X-ray intensity distribution diagram) showing X-ray intensity distributions of Ce, Zr, La, and Pr in the range from the surface of the particle to a depth of 300 nm in the particle was obtained. FIG. 2 shows an example of the thus obtained X-ray intensity distribution diagram.

Next, on the basis of the thus obtained X-ray intensity distribution diagram, the cumulative X-ray intensity value of the measurement target element in each region was determined, and the content ratio ($RE_{0-50}$) of the surface additive element (RE) in the near-surface upper-layer region ($SR_{0-50}$), the content ratio ($RE_{50-100}$) of the surface additive element (RE) in the near-surface lower-layer region ($SR_{50-100}$), and the content ratio ($RE_{0-100}$) of the surface additive element (RE) in the near-surface region ($SR_{0-100}$) were respectively calculated according to the mathematical expressions (1) to (3).

Then, the average value of the values determined from all the line analysis results of all the extracted primary particles was determined. Thus, the content ratio of the surface additive element (La) contained in each of the near-surface upper-layer region, the near-surface lower-layer region, and the near-surface region of the La/Pr—CZ composite oxide powder, which was the measurement target, was determined. Table 2 shows the obtained results. Note that since it was confirmed that no surface additive element (RE) was substantially present in the region beyond a depth of 300 nm from the surface of each primary particle, the cumulative X-ray intensity value of RE in $SR_{0-300}$ was substantially equivalent to the entire amount of RE contained in the primary particles. In addition, the content ratio of the surface additive element (RE) in each of the regions before the heat-resistance test did not substantially change after the heat-resistance test.

<Measurement of Average Particle Diameter of Primary Particles>

The La/Pr—CZ composite oxide powder after the heat-resistance test was observed by using the above-described Cs-STEM for the average particle diameter of primary particles. Note that the average particle diameter was determined by measuring the particle diameters of randomly selected 50 primary particles, and calculating the average value of the particle diameters. In addition, when the cross-section was not circular, the diameter of the smallest circumcircle was taken as the particle diameter. Table 2 shows the obtained results. Note that the average particle diameter of the primary particles before the heat-resistance test did not substantially change after the heat-resistance test.

<X-Ray Diffraction (XRD) Measurement>

The crystal phase of the La/Pr—CZ composite oxide powder after the heat-resistance test was measured by the X-ray diffraction method. Specifically, an X-ray diffraction pattern was measured by using an X-ray diffractometer (manufactured by Rigaku Corporation, trade name: RINT-Ultima) (CuKα radiation, 40 KV, 40 mA, 2θ=5°/min), and the I(14/29) value, which served as an index of the ratio of the superlattice structure retained, was determined. Table 2 shows the obtained results.

<Test for Measuring Amount of Oxygen Absorbed and Desorbed: OSC Evaluation>

The La/Pr—CZ composite oxide powder after the heat-resistance test and a Rh/Al$_2$O$_3$ powder supporting Rh (0.5% by weight) were physically mixed with each other in a mortar at a mass ratio of 1:1, followed by pressing and pulverization to obtain a catalyst for purification of exhaust gas in the form of pellets having diameters of 0.5 mm to 1 mm.

The obtained catalyst (20 mg) was weighed out, and measured for the amount of oxygen absorbed and desorbed by using a thermogravimetric analyzer. Note that the amount of oxygen absorbed and desorbed refers to an amount of oxygen absorbed and desorbed per 20 mg of a catalyst (O$_2$-mg/cat-20 mg) at 300° C., and was obtained by placing the above-described catalyst sample in a sample cell of a thermogravimetric analyzer (manufactured by Shimadzu Corporation, trade name: TGA-50), allowing a reducing atmosphere gas made up of H$_2$ (4% by volume) and N$_2$ (96% by volume) and an oxidizing atmosphere gas made up of O$_2$ (5% by volume) and N$_2$ (95% by volume) to pass through 20 mg of the catalyst each at a flow rate of 100 ml/min under a temperature condition of 300° C. alternately every 20 minutes for 120 minutes in total (the number of reduction-oxidation cycles: three), and determining the amount of oxygen absorbed and desorbed from the reversible weight change by using the above-described thermogravimetric analyzer. For the evaluation, the value on the oxygen release side (reduction side) was used. Table 2 shows the obtained results. Note that the OSC of the La/Pr—CZ composite oxide powder before the heat-resistance test was 0.203 [O$_2$-mg/cat-20 mg]@300° C.

Example 2

A lanthanum/praseodymium-containing ceria-zirconia composite oxide powder (La/Pr—CZ composite oxide powder) containing lanthanum in the near-surface region and having the composition shown in Table 1 was obtained in the same manner as in Example 1, except that the treatment temperature in the reduction treatment, which was the main heat treatment after La was supported on the Pr—CZ composite oxide powder, was changed to 1600° C.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results. Note that the OSC of the La/Pr—CZ composite oxide powder before the heat-resistance test was 0.198 [O$_2$-mg/cat-20 mg]@300° C.

Example 3

A lanthanum/praseodymium-containing ceria-zirconia composite oxide powder (La/Pr—CZ composite oxide powder) containing lanthanum in the near-surface region and having the composition shown in Table 1 was obtained in the same manner as in Example 1, except that the treatment temperature in the reduction treatment, which was the main heat treatment after La was supported on the Pr—CZ composite oxide powder, was changed to 1200° C.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results. Note that the OSC of the La/Pr—CZ composite oxide powder before the heat-resistance test was 0.192 [O$_2$-mg/cat-20 mg]@300° C.

Example 4

A lanthanum/praseodymium-containing ceria-zirconia composite oxide powder (La/Pr—CZ composite oxide powder) containing lanthanum in the near-surface region and having the composition shown in Table 1 was obtained in the same manner as in Example 1, except that the amount of La contained in the obtained La/Pr—CZ composite oxide powder was changed to 5.0% by atom in terms of element relative to the total amount of cerium and zirconium in the composite oxide powder.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results.

Example 5

A lanthanum/praseodymium-containing ceria-zirconia composite oxide powder (La/Pr—CZ composite oxide powder) containing lanthanum in the near-surface region and having the composition shown in Table 1 was obtained in the same manner as in Example 4, except that the treatment temperature in the reduction treatment, which was the main heat treatment after La was supported on the Pr—CZ composite oxide powder, was changed to 1600° C.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results.

Example 6

A lanthanum/praseodymium-containing ceria-zirconia composite oxide powder (La/Pr—CZ composite oxide powder) containing lanthanum in the near-surface region and having the composition shown in Table 1 was obtained in the same manner as in Example 4, except that the treatment temperature in the reduction treatment, which was the main heat treatment after La was supported on the Pr—CZ composite oxide powder, was changed to 1200° C.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results.

Example 7

A neodymium/praseodymium-containing ceria-zirconia composite oxide powder (Nd/Pr—CZ composite oxide powder) containing neodymium in the near-surface region and having the composition shown in Table 1 was obtained in the same manner as in Example 1, except that neodymium nitrate was used instead of lanthanum nitrate.

By using the obtained Nd/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results.

Example 8

A yttrium/praseodymium-containing ceria-zirconia composite oxide powder (Y/Pr—CZ composite oxide powder) containing yttrium in the near-surface region and having the composition shown in Table 1 was obtained in the same manner as in Example 1, except that yttrium nitrate was used instead of lanthanum nitrate.

By using the obtained Y/Pr—CZ composite oxide powder, a high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results.

Comparative Example 1

By directly using the praseodymium-containing ceria-zirconia composite oxide powder (Pr—CZ composite oxide powder) obtained in <Preparation of Pr—CZ Composite Oxide Powder> in Example 1 without supporting the surface additive element, the high-temperature durability test was conducted in the same manner as in Example 1, and the measurement of the average particle diameter of primary particles, the X-ray diffraction (XRD) measurement, and the OSC measurement were conducted in the same manner as in Example 1. Table 2 shows the obtained results. Note that the OSC of the Pr—CZ composite oxide powder before the heat-resistance test was 0.184 [$O_2$-mg/cat-20 mg]@300° C.

Comparative Example 2

Lanthanum (La) was supported on the praseodymium-containing ceria-zirconia composite oxide powder (Pr—CZ composite oxide powder) obtained in <Preparation of Pr—CZ Composite Oxide Powder> in Example 1 by an water-absorption supporting method such that the amount of lanthanum (La) was 0.5% by atom in terms of element relative to the total amount of cerium and zirconium in the Pr—CZ composite oxide powder. Then, the La-supporting Pr—CZ composite oxide powder was separated by filtration, and dried in air at 110° C. for 12 hours. Next, the obtained La-supporting Pr—CZ composite oxide powder was calcined in air at 900° C. for 5 hours. Thus, a lanthanum/praseodymium-containing ceria-zirconia composite oxide powder (La/Pr—CZ composite oxide powder) containing lanthanum in the near-surface region and having the composition shown in Table 1 was obtained.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results. Note that the OSC of the La/Pr—CZ composite oxide powder before the heat-resistance test was 0.174 [$O_2$-mg/cat-20 mg]@300° C.

Comparative Example 3

A lanthanum/praseodymium-containing ceria-zirconia composite oxide powder (La/Pr—CZ composite oxide powder) containing lanthanum in the near-surface region and having the composition shown in Table 1 was obtained in the same manner as in Comparative Example 2, except that the amount of La contained in the obtained La/Pr—CZ composite oxide powder was changed to 2.5% by atom in terms of element relative to the total amount of cerium and zirconium in the composite oxide powder.

Figure 3:
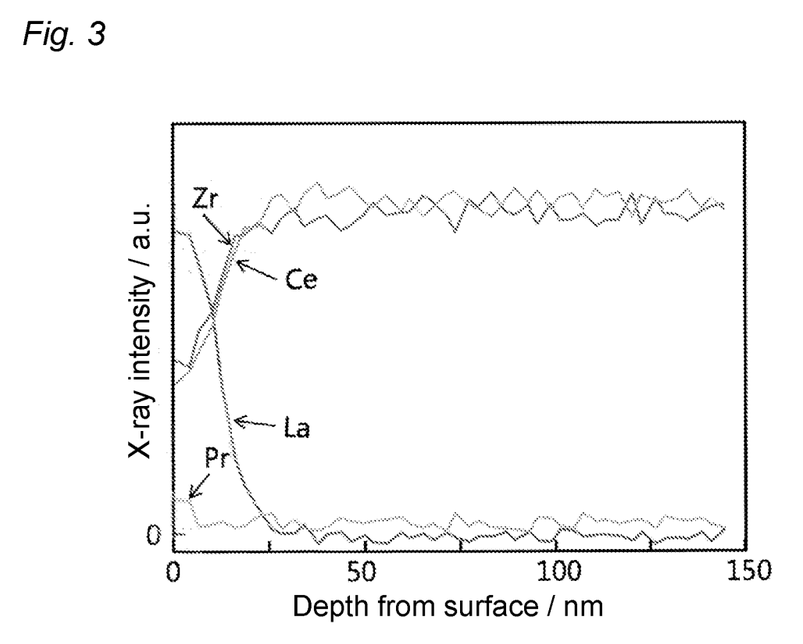
FIG. 3 is a graph showing an example of X-ray intensity distributions of Ce, Zr, La, and Pr in a range from the surface of a primary particle to a depth of 150 nm in the primary particle of a composite oxide obtained in Comparative Example 3.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results. In addition, FIG. 3 shows an example of a graph (X-ray intensity distribution diagram) showing X-ray intensity distributions of Ce, Zr, La, and Pr of the La/Pr—CZ composite oxide powder obtained in Comparative Example 3 in a range from the surface of each primary particle to a depth of 150 nm in the primary particle. Note that the OSC of the La/Pr—CZ composite oxide powder before the heat-resistance test was 0.182 [$O_2$-mg/cat-20 mg]@300° C.

Comparative Example 4

A lanthanum/praseodymium-containing ceria-zirconia composite oxide powder (La/Pr—CZ composite oxide powder) containing lanthanum in the near-surface region and having the composition shown in Table 1 was obtained in the same manner as in Example 1, except that the amount of La contained in the obtained La/Pr—CZ composite oxide powder was changed to 15.0% by atom in terms of element relative to the total amount of cerium and zirconium in the composite oxide powder.

By using the obtained La/Pr—CZ composite oxide powder, the high-temperature durability test was conducted in the same manner as in Example 1, and the measurement of the content ratio of the surface additive element in the near-surface region, the measurement of the average particle diameter of primary particles, the X-ray diffraction (XRD) measurement, and the OSC measurement were conducted in the same manner as in Example 1. Table 2 shows the obtained results.

particle, but also in the near-surface lower-layer region extending from a depth of 50 nm to a depth of 100 nm in the primary particle in their respective predetermined amounts. In addition, as shown in FIG. 2, it was found that the rare-earth element was solid-dissolved in the vicinity of the surface of each primary particle in the thus obtained composite oxide by selectively substituting Ce sites.

On the other hand, in Comparative Examples 2 and 3 in each of which a ceria-zirconia based composite oxide powder supporting a rare-earth element on its surface was calcined under an oxidizing atmosphere at 900° C., it was found that the entire amount of the rare-earth element was

TABLE 1

| | Composition | | | | Main heat treatment after supporting of surface additive element | |
|---|---|---|---|---|---|---|
| | Main component elements | | Additive elements | | Treatment | Treatment |
| | Ce [at %] | Zr [at %] | Entire region (*1) | Surface (*1) | temperature [° C.] | atmosphere |
| Ex. 1 | 44.6 | 55.4 | Pr (2.5) | La (2.5) | 1400 | Reduction |
| Ex. 2 | 44.6 | 55.4 | Pr (2.5) | La (2.5) | 1600 | Reduction |
| Ex. 3 | 44.6 | 55.4 | Pr (2.5) | La (2.5) | 1200 | Reduction |
| Ex. 4 | 44.6 | 55.4 | Pr (2.5) | La (5.0) | 1400 | Reduction |
| Ex. 5 | 44.6 | 55.4 | Pr (2.5) | La (5.0) | 1600 | Reduction |
| Ex. 6 | 44.6 | 55.4 | Pr (2.5) | La (5.0) | 1200 | Reduction |
| Ex. 7 | 44.6 | 55.4 | Pr (2.5) | Nd (2.5) | 1400 | Reduction |
| Ex. 8 | 44.6 | 55.4 | Pr (2.5) | Y (2.5) | 1400 | Reduction |
| Comp. Ex. 1 | 44.6 | 55.4 | Pr (2.5) | — | — | — |
| Comp. Ex. 2 | 44.6 | 55.4 | Pr (2.5) | La (0.5) | 900 | Oxidation (in air) |
| Comp. Ex. 3 | 44.6 | 55.4 | Pr (2.5) | La (2.5) | 900 | Oxidation (in air) |
| Comp. Ex. 4 | 44.6 | 55.4 | Pr (2.5) | La (15.0) | 1400 | Reduction |

(*1): Content ratio [at %] in terms of element relative to total amount of Ce and Zr

TABLE 2

| | Content ratio of surface additive element (*2) | | | | | |
|---|---|---|---|---|---|---|
| | Near-surface upper-layer region ($SR_{0-50}$) | Near-surface lower-layer region ($SR_{50-100}$) | Near-surface region ($SR_{0-100}$) | I (14/29) value | Average particle diameter of primary particles [μm] | OSC amount [$O_2$-mg/cat-20 mg] @300° C. (after heat-resistance test) |
| Ex. 1 | 69 | 31 | 100 | 0.035 | 3.5 | 0.17 |
| Ex. 2 | 64 | 36 | 100 | 0.034 | 4.0 | 0.15 |
| Ex. 3 | 80 | 20 | 100 | 0.033 | 3.5 | 0.15 |
| Ex. 4 | 65 | 26 | 91 | 0.033 | 3.5 | 0.17 |
| Ex. 5 | 60 | 30 | 90 | 0.035 | 3.7 | 0.15 |
| Ex. 6 | 70 | 25 | 95 | 0.032 | 3.5 | 0.16 |
| Ex. 7 | 68 | 32 | 100 | 0.034 | 3.5 | 0.15 |
| Ex. 8 | 67 | 33 | 100 | 0.035 | 3.5 | 0.16 |
| Comp. Ex. 1 | — | — | — | 0.032 | 3.0 | 0.10 |
| Comp. Ex. 2 | 100 | 0 | 100 | 0.032 | 3.5 | 0.10 |
| Comp. Ex. 3 | 100 | 0 | 100 | 0.031 | 3.5 | 0.10 |
| Comp. Ex. 4 | 65 | 14 | 79 | 0.028 | 3.8 | 0.08 |

(*2): Content ratio [at %] of surface additive element present in each region in terms of element relative to total amount of surface additive element <Results of Evaluation Tests>

As is apparent from the results shown in Tables 1 and 2, in Examples 1 to 8 in each of which a ceria-zirconia based composite oxide powder supporting a rare-earth element selected from lanthanum, yttrium, and neodymium in a predetermined amount (1 to 10% by atom in terms of element relative to the total amount of Ce and Zr) was subjected to a reduction treatment under a reducing atmosphere at a high temperature of 1200 to 1600° C., it was found that a ceria-zirconia based composite oxide was obtained in which the rare-earth elements were contained not only in the near-surface upper-layer region extending from the surface of each primary particle of the obtained composite oxide powder to a depth of 50 nm in the primary particle, but also in the near-surface lower-layer region extending from a depth of 50 nm to a depth of 100 nm in the primary particle in their respective predetermined amounts. In addition, as shown in FIG. 3, it was found that the rare-earth element was solid-dissolved in the vicinity of the surface of each primary particle in the thus obtained composite oxide by randomly substituting both Ce sites and Zr sites indiscriminately.

In addition, it was found that the ceria-zirconia based composite oxides obtained in Examples 1 to 8, in each of which the rare-earth elements were contained not only in the near-surface upper-layer region extending from the surface of each primary particle to a depth of 50 nm in the primary particle, but also in the near-surface lower-layer region extending from a depth of 50 nm to a depth of 100 nm in the primary particle in their respective predetermined amounts, exhibited an excellent low-temperature oxygen storage capacity (low-temperature OSC) from a low temperature of about 300° C., and also had a high ratio of the superlattice structure retained, had an improved heat resistance against high temperature, and sufficiently retained the low-temperature activity of the oxygen storage capacity even after exposure to exhaust gas at a high temperature of about 1100° C. for a long period, in comparison with the composite oxide obtained in Comparative Example 1 not containing the rare-earth element, or the composite oxides obtained in Comparative Examples 2 and 3, in which the rare-earth element was not contained in the near-surface lower-layer region extending from a depth of 50 nm to a depth of 100 nm in each primary particle, and the composite oxide obtained in Comparative Example 4 in which the amount of the rare-earth element contained was large, and the rare-earth element content in the near-surface lower-layer region was low.

According to the present invention, it is possible to provide an oxygen storage material having both an excellent low-temperature oxygen storage capacity (low-temperature OSC) and an excellent high-temperature durability such that the excellent oxygen storage capacity (OSC) is expressed from a low temperature of about 300° C. and also the low-temperature activity of the oxygen storage capacity is sufficiently maintained even after exposure to exhaust gas at a high temperature of about 1100° C. for a long period, as well as a method for producing the oxygen storage material, as described above.

Since the ceria-zirconia based composite oxide of the present invention has both a sufficiently excellent oxygen storage capacity (OSC) and a sufficiently high heat resistance as described above, the ceria-zirconia based composite oxide of the present invention can be used preferably as a support, auxiliary catalyst, or catalyst atmosphere-adjusting material for a catalyst for purification of exhaust gas, or the like.

What is claimed is:

1. An oxygen storage material comprising a ceria-zirconia based composite oxide containing a composite oxide of ceria and zirconia, wherein
   the ceria-zirconia based composite oxide comprises a surface additive element comprising at least one rare-earth element selected from the group consisting of lanthanum, yttrium, and neodymium, and an amount of the rare-earth element(s) contained in total is 1 to 10% by atom in terms of element relative to a total amount of cerium and zirconium in the ceria-zirconia based composite oxide,
   60 to 85% by atom of the entire amount of the rare-earth element(s) is contained in a near-surface upper-layer region extending from a surface of each primary particle of the ceria-zirconia based composite oxide to a depth of 50 nm in the primary particle, and 15 to 40% by atom of the entire amount of the rare-earth element(s) is contained in a near-surface lower-layer region extending from a depth of 50 nm to a depth of 100 nm in the primary particle,
   a content ratio of cerium and zirconium in the ceria-zirconia based composite oxide is in a range of 40:60 to 60:40 in terms of an atomic ratio ([Ce]:[Zr]), and
   the ceria-zirconia based composite oxide has an intensity ratio {I(14/29) value} between a diffraction line at 2θ=14.5° and a diffraction line at 2θ=29° which satisfies the following condition:

$I(14/29)$ value≥0.032, where the intensity ratio {I(14/29) value} is determined from an X-ray diffraction pattern using CuKα obtained by an X-ray diffraction measurement conducted after heating in air under a temperature condition of 1100° C. for 5 hours.

2. The oxygen storage material according to claim 1, wherein
   80% by atom or more of the entire amount of the rare-earth element(s) is contained in a near-surface region extending from the surface of each primary particle of the ceria-zirconia based composite oxide to a depth of 100 nm in the primary particle.

3. The oxygen storage material according to claim 1, wherein
   the primary particles of the ceria-zirconia based composite oxide have an average particle diameter of 2.2 to 4.5 μm.

4. The oxygen storage material according to claim 2, wherein
   the primary particles of the ceria-zirconia based composite oxide have an average particle diameter of 2.2 to 4.5 μm.

5. The oxygen storage material according to claim 1, wherein
   the ceria-zirconia based composite oxide further comprises at least one additive element selected from the group consisting of praseodymium, scandium, samarium, gadolinium, terbium, dysprosium, ytterbium, lutetium, magnesium, calcium, strontium, barium, and radium, and an amount of the additive element(s) contained in total is 1 to 20% by atom in terms of element relative to the total amount of cerium (Ce) and zirconium (Zr) in the ceria-zirconia based composite oxide.

6. The oxygen storage material according to claim 2, wherein
   the ceria-zirconia based composite oxide further comprises at least one additive element selected from the group consisting of praseodymium, scandium, samarium, gadolinium, terbium, dysprosium, ytterbium, lutetium, magnesium, calcium, strontium, barium, and radium, and an amount of the additive element(s) contained in total is 1 to 20% by atom in terms of element relative to the total amount of cerium (Ce) and zirconium (Zr) in the ceria-zirconia based composite oxide.

7. The oxygen storage material according to claim 3, wherein
   the ceria-zirconia based composite oxide further comprises at least one additive element selected from the group consisting of praseodymium, scandium, samarium, gadolinium, terbium, dysprosium, ytterbium, lutetium, magnesium, calcium, strontium, barium, and radium, and an amount of the additive element(s) contained in total is 1 to 20% by atom in terms of element relative to the total amount of cerium (Ce) and zirconium (Zr) in the ceria-zirconia based composite oxide.

8. The oxygen storage material according to claim 4, wherein
   the ceria-zirconia based composite oxide further comprises at least one additive element selected from the group consisting of praseodymium, scandium, samarium, gadolinium, terbium, dysprosium, ytterbium, lutetium, magnesium, calcium, strontium, barium, and radium, and an amount of the additive element(s) contained in total is 1 to 20% by atom in terms of element relative to the total amount of cerium (Ce) and zirconium (Zr) in the ceria-zirconia based composite oxide.

9. A method for producing an oxygen storage material comprising a ceria-zirconia based composite oxide containing a composite oxide of ceria and zirconia, the method comprising the steps of:
preparing a ceria-zirconia based composite oxide powder having a content ratio of cerium and zirconium in a range of 40:60 to 60:40 in terms of atomic ratio ([Ce]:[Zr]);
causing the composite oxide powder obtained in the preparing step to support a surface additive element comprising at least one rare-earth element selected from the group consisting of lanthanum, yttrium, and neodymium such that an amount of the rare-earth element(s) contained in total is 1 to 10% by atom in terms of element relative to a total amount of cerium and zirconium in the ceria-zirconia based composite oxide; and
subjecting the ceria-zirconia based composite oxide powder supporting the rare-earth element(s) of the surface additive element to a reduction treatment under a reducing atmosphere at 1200 to 1600° C. to obtain the oxygen storage material comprising the ceria-zirconia based composite oxide according to claim 1.

10. The method for producing an oxygen storage material according to claim 9, further comprising, before the reduction treatment, a step of subjecting the ceria-zirconia based composite oxide powder supporting the rare-earth element(s) to an oxidation treatment under an oxidizing atmosphere at 300 to 800° C.

11. The method for producing an oxygen storage material according to claim 9, further comprising, after the reduction treatment, a step of subjecting the ceria-zirconia based composite oxide powder, which has been subjected to the reduction treatment, to an oxidation treatment under an oxidizing atmosphere at 300 to 800° C.

12. The method for producing an oxygen storage material according to claim 10, further comprising, after the reduction treatment, a step of subjecting the ceria-zirconia based composite oxide powder, which has been subjected to the reduction treatment, to an oxidation treatment under an oxidizing atmosphere at 300 to 800° C.

* * * * *